United States Patent
Chae

(10) Patent No.: US 12,242,731 B2
(45) Date of Patent: Mar. 4, 2025

(54) APPARATUS AND METHOD FOR RECOVERING DATA IN A MEMORY SYSTEM

(71) Applicant: SK hynix Inc., Gyeonggi-do (KR)

(72) Inventor: Chol Su Chae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/957,321

(22) Filed: Sep. 30, 2022

(65) Prior Publication Data

US 2023/0376212 A1 Nov. 23, 2023

(30) Foreign Application Priority Data

May 17, 2022 (KR) .................. 10-2022-0060364

(51) Int. Cl.
 *G06F 3/06* (2006.01)
(52) U.S. Cl.
 CPC ............ *G06F 3/0616* (2013.01); *G06F 3/064* (2013.01); *G06F 3/0659* (2013.01); *G06F 3/0679* (2013.01)
(58) Field of Classification Search
 CPC ...... G06F 3/061; G06F 3/0614; G06F 3/0616; G06F 3/0617; G06F 3/0619; G06F 3/0623; G06F 3/064; G06F 3/0679; G06F 3/0658
 See application file for complete search history.

(56) References Cited

U.S. PATENT DOCUMENTS

| | | | |
|---|---|---|---|
| 10,318,163 B2 | 6/2019 | Dalmatov | |
| 11,086,705 B2 | 8/2021 | Papandreou et al. | |
| 2013/0262920 A1* | 10/2013 | Jung | G06F 3/061 |
| | | | 714/6.22 |
| 2016/0364181 A1* | 12/2016 | McGlaughlin | G06F 3/0629 |
| 2017/0115901 A1* | 4/2017 | Franke | G06F 3/0616 |
| 2018/0024877 A1* | 1/2018 | Gold | G06F 3/065 |
| | | | 714/773 |
| 2019/0065389 A1* | 2/2019 | Choi | G06F 3/061 |
| 2019/0102253 A1* | 4/2019 | Televitckiy | G06F 11/1076 |

(Continued)

OTHER PUBLICATIONS

Kim, Jaeho, Jongmin Lee, Jongmoo Choi, Donghee Lee, and Sam H. Noh. "Improving SSD reliability with RAID via elastic striping and anywhere parity." In 2013 43rd Annual IEEE/IFIP International Conference on Dependable Systems and Networks (DSN), pp. 1-12. IEEE, 2013.*

(Continued)

*Primary Examiner* — Tracy A Warren
(74) *Attorney, Agent, or Firm* — IP & T GROUP LLP

(57) ABSTRACT

A memory system includes a memory device and a controller. The memory device includes a plurality of memory blocks for storing or outputting plural data entries and a first parity entry associated with the plural data entries. The controller a second parity entry based on a part of the plural data entries, an updated data entry which renews the part of the plural data entries, and the first parity entry, in response to an update event regarding the part of the plural data entries, allocate, for storing the second parity entry, a first memory block having least program-erase cycles among the plurality of memory blocks, allocate, for storing the updated data entry, a second memory block storing the first parity entry, and control the memory device to program the updated data entry and the second parity entry in the first memory block and the second memory block.

19 Claims, 10 Drawing Sheets

(56) References Cited

U.S. PATENT DOCUMENTS

| | | | | |
|---|---|---|---|---|
| 2020/0174689 A1* | 6/2020 | Hutchison | ............ | G06F 3/0689 |
| 2020/0326857 A1* | 10/2020 | Paley | ................... | G06F 3/0679 |
| 2023/0061994 A1* | 3/2023 | Li | ........................ | G06F 3/0659 |

OTHER PUBLICATIONS

Kim, Jaeho, Eunjae Lee, Jongmoo Choi, Donghee Lee, and Sam H. Noh. "Chip-level RAID with flexible stripe size and parity placement for enhanced SSD reliability." IEEE Transactions on Computers 65, No. 4 (2016): 1116-1130.*

Koo, Sohyun, Se Jin Kwon, Sungsoo Kim, and Tae-Sun Chung. "Dual RAID technique for ensuring high reliability and performance in SSD." In 2015 IEEE/ACIS 14th International Conference on Computer and Information Science (ICIS), pp. 399-404. IEEE, 2015.*

Kim, Jaeho, Eunjae Lee, and Jung Kyu Park. "Flash based SSD Aware Parity Logging for Building Reliable Massive Capacity SSDs." In 2020 IEEE International Conference on Consumer Electronics (ICCE), pp. 1-4. IEEE, 2020.*

Wang, S., Wu, F., Lu, Z., Zhou, J., & Xie, C. (2018). Ward: Wear aware raid design within ssds. IEEE Transactions on Computer-Aided Design of Integrated Circuits and Systems, 37(11), 2918-2928.*

Lee, S., Lee, B., Koh, K., & Bahn, H. (Mar. 2011). A lifespan-aware reliability scheme for RAID-based flash storage. In Proceedings of the 2011 ACM Symposium on Applied Computing (pp. 374-379).*

Li, Y., Shen, B., Pan, Y., Xu, Y., Li, Z., & Lui, J. C. (2016). Workload-aware elastic striping with hot data identification for SSD RAID arrays. IEEE Transactions on Computer-Aided Design of Integrated Circuits and Systems, 36(5), 815-828.*

* cited by examiner

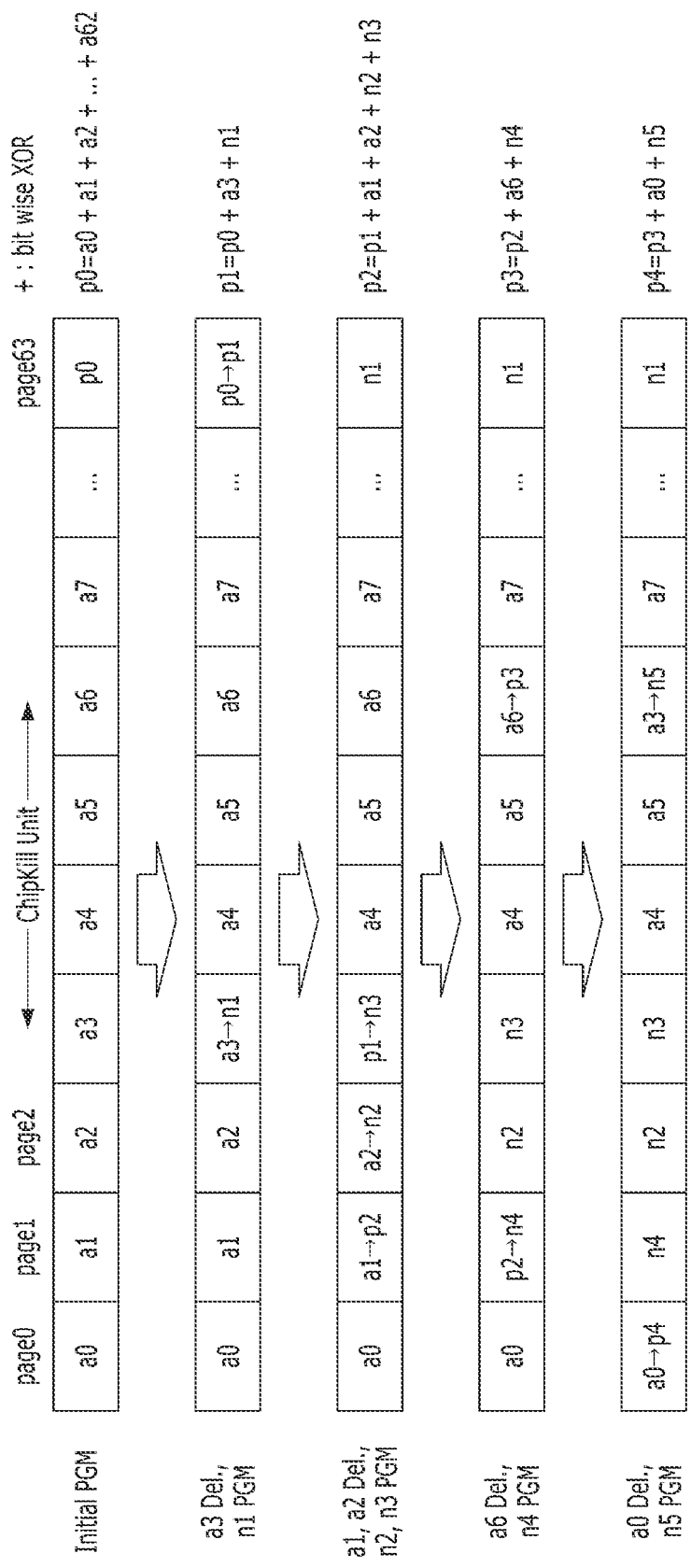

APPARATUS AND METHOD FOR RECOVERING DATA IN A MEMORY SYSTEM

CROSS-REFERENCE TO RELATED APPLICATIONS

This patent application claims the benefit of Korean Patent Application No. 10-2022-0060364, filed on May 17, 2022, the entire disclosure of which is incorporated herein by reference.

TECHNICAL FIELD

One or more embodiments of the present disclosure described herein relate to a memory system, and a method of operation thereof, and more particularly, to a memory system apparatus and a method for recovering data in the memory system, BACKGROUND A data processing system includes a memory system, often, also referred to as a data storage device. Currently, significant research focused on developing improved data processing systems that can store more data, bigger data, in a faster and more reliable manner and retrieve the store data as needed in a faster and more reliable manner also. The memory system can include non-volatile memory cells and/or volatile memory cells for storing data.

BRIEF DESCRIPTION OF THE DRAWINGS

The description herein makes reference to the accompanying drawings wherein like reference numerals refer to like parts throughout the figures.

FIG. 10 illustrates where locations for storing a partial data entry and a parity entry are changed according to an embodiment of the present disclosure.

DETAILED DESCRIPTION

Figure 1:
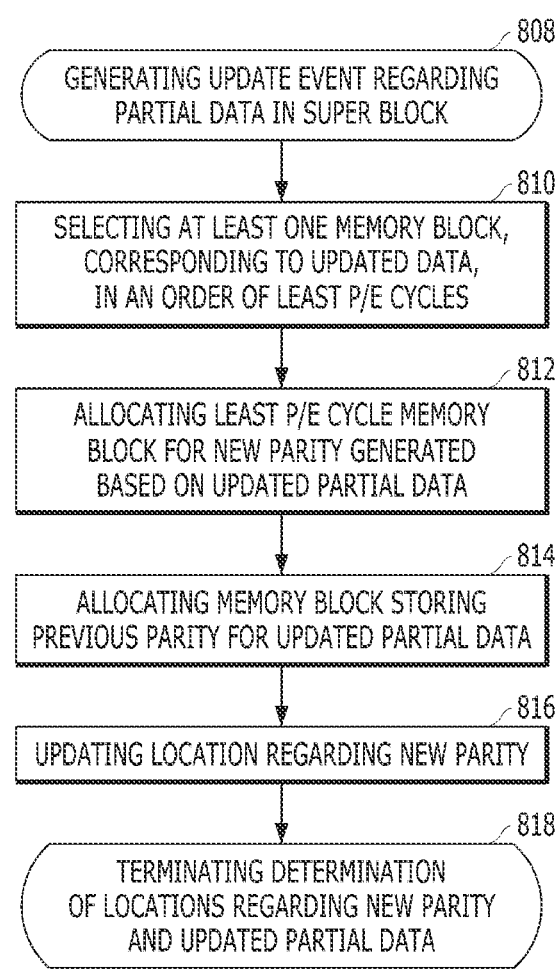
FIG. 1 illustrates a method for operating a memory system according to an embodiment of the present disclosure.

Various embodiments of the present disclosure are described below with reference to the accompanying drawings. Elements and features of this disclosure may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comp s ng," "include," and "including" are open-ended. As used in the appended claims, these terms specify the presence of the stated elements and do not preclude the presence or addition of one or more other elements. Furthermore, the terms in a claim do not foreclose the apparatus from including additional components, e.g., an interface unit, circuitry, etc.

In this disclosure, various units, circuits, or other components may be described or claimed as "configured to" perform a task or tasks. In such contexts, "configured to" is used to connote structure by indicating that the blocks/units/ circuits/components include structure (e.g., circuitry) that performs one or more tasks during operation. As such, the block/unit/circuit/component can be said to be configured to perform the task even when the specified block/unit/circuit/ component is not currently operational, e.g., is not turned on nor activated. The block/unit/circuit/component used with the "configured to" language include hardware, for example, circuits, memory storing program instructions executable to implement the operation, etc, Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits, According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment of the present disclosure can provide a memory system, a data processing system, and an operation process or a method, which may quickly and reliably process data into a memory device by reducing operational complexity and performance degradation of the memory system, thereby enhancing usage efficiency of the memory device.

An embodiment of the present disclosure can provide an apparatus and method capable of enhancing or improving durability or a lifespan of a non-volatile memory device and improving performance regarding data input/output operations performed within a memory system. The memory system can generate a parity entry for plural data entries and determine a location where a generated parity entry is stored.

In an embodiment, a memory system can include a memory device including a plurality of memory blocks for storing or outputting plural data entries and a first parity entry associated with the plural data entries; and a controller configured to: generate a second parity entry based on a part of the plural data entries, an updated data entry which renews the part of the plural data entries, and the first parity entry, in response to an update event regarding the part of the plural data entries; allocate, for storing the second parity entry, a first memory block having least program-erase cycles among the plurality of memory blocks; allocate, for storing the updated data entry, a second memory block storing the first parity entry; and control the memory device to program the updated data entry and the second parity entry in the first memory block and the second memory block.

The memory device can include at least one of a plurality of memory dies or plural memory planes, Each of the plurality of memory blocks establishing a super memory block can be included in each of the plurality of memory dies or each of the plurality of memory planes.

Both the first parity entry and the second parity entry can be programmed in a same memory die or a same memory plane.

The first parity entry and the second parity entry can be individually programmed in different memory dies or different memory planes.

The controller can be configured to allocate, for storing the second parity entry, another memory block which is different from a memory block storing the first parity entry, when the first memory block and the second memory block have the same program-erase cycles.

The controller can be further configured to retain map data associated with an unrenewed part of the plural data entries without renewal.

The controller can be further configured to load map data from the memory device, the map data linking physical addresses of the plural data entries and the first parity entry to logical addresses of the plural data entries and a parity indicator for indicating the first parity entry; update physical addresses in some entries of the map data, the some entries associated with a logical address for the updated data entry and the parity indicator for indicating the second parity entry; and program updated map data in the memory device.

The update event can be generated based on at least one of garbage collection, wear leveling, or read reclaim, which is associated with copying or moving of the part of the plural data entries, or a program operation performed for renewing the part of the plural data entries when a write command along with the updated data entry is inputted from an external device.

In another embodiment, a memory controller is coupled to a memory device in which plural data entries and a first parity entry are distributed and stored in a plurality of memory regions. The memory controller can be configured to generate a second parity entry based on a part of the plural data entry, an updated data entry which renews the part of the plural data entries, and the first parity entry, in response to an update event regarding the part of the plural data entries; select, for storing the second parity entry, an open memory block having the least program-erase cycles among open memory blocks in the plurality of memory regions; and control the memory device to program the updated data entry and the second parity entry in different memory regions including the selected open memory block.

Each of the plurality of memory regions comprises a memory die.

Each of the plurality of memory regions comprises a memory plane.

The controller can be further configured to generate the first parity entry based on the plural data entries; select a first memory block which has least program-erase cycles (PIE cycles) among plural open memory blocks in the plurality of memory regions; and program the first parity entry in the first memory block.

The controller can be further configured to load map data from the memory device, the map data linking physical addresses of the plural data entries and the first parity entry to logical addresses of the plural data entries and a parity indicator for indicating the first parity entry; update physical addresses in some entries of the map data, the some entries being associated with a logical address for the updated data entry and the parity indicator for indicating the second parity entry, while retaining the map data associated with an unrenewed part of the plural data entries without renewal; and program updated map data in the memory device.

The update event can be generated based on at least one of garbage collection, wear leveling, or read reclaim, which is associated with copying or moving of the part of the plural data entries, or a program operation performed for renewing the part of the plural data entries when a write command along with the updated data entry is inputted from an external device.

The controller can be further configured to establish a super memory block based on the plurality of memory regions, and access a part of the plural data entries in a part of the plurality of memory regions during a read or write operation performed in response to a read or write command.

In another embodiment, a method for operating a memory system can include distributing and storing plural data entries and a first parity entry in plural memory regions included in a memory device; generating a second parity entry based on a part of plural data entries, an updated data entry which renews the part of the plural data entries, and the first parity entry, in response to an update event regarding the part of the plural data entries; selecting, for storing the second parity data, a memory region including an open memory block having least program-erase cycle (PIE Cycles) among the plurality of memory regions; and controlling the memory device to program the updated data entry and the second parity entry in different memory regions including the selected memory region.

The method can further include allocating, for storing the updated data entry, an open memory block included in a memory region storing the first parity entry among the plurality of memory regions.

The distributing and storing of the plural data entries can include generating the first parity entry corresponding to the plural data entries; and programming the first parity entry in a first memory block which has least program-erase cycles among plural open memory blocks in the plurality of memory regions.

The method can further include loading map data from the memory device, the map data linking physical addresses of the plural data entries and the first parity entry to logical addresses of the plural data entries and a parity indicator for indicating the first parity entry; updating physical addresses in some entries of the map data, the some entries associated with a logical address for the updated data entry and the parity indicator for indicating the second parity entry, and retaining the map data associated with an unrenewed part of the plural data entries without renewal; and programming updated map data in the memory device.

The update event can be generated based on at least one of garbage collection, wear leveling, or read reclaim, which is associated with copying or moving of the part of the plural data entries, or a program operation performed for renewing the part of the plural data entries when a write command along with the updated data entry is inputted from an external device.

In another embodiment, an operating method of a controller can include controlling a memory device to store, into respective memory blocks arranged in respective storage units, a group of data pieces and a first parity data for the group; generating, when replacing an original piece within the group with an updated piece, a second parity data for the group based on the updated piece, the original piece and the first parity data; and controlling the memory device to store the updated piece and the second parity data respectively into first and second open memory blocks within the storage units. The first open memory block can be included in the storage unit storing the first parity data. The second open memory block can have least program/erase (PIE) cycles among open memory blocks within the storage units.

An embodiment described herein can provide an apparatus and a method for improving a data input/output operation of a memory system or a data processing system.

Embodiments will now be described with reference to the accompanying drawings, wherein like numbers reference like elements.

FIG. 1 illustrates a method for operating a memory system according to an embodiment of the present disclosure.

Referring to FIG. 1, an operation of the memory system can Include generating an update event regarding some data entry/entries among plural data entries stored in a super memory block unit (808). An update event for some data entries, corresponding to a part of the plural data entries, can occur when a write request along with some data entry/entries is/are input from an external device (e.g., a host 102, see FIGS. 2 to 3) coupled to a memory system (e.g., a memory system 110, see FIGS. 2 to 3). For example, validity of the plural data entries can be determined based at least on a logical address used by an external device and a physical address used within a memory system. When the external device transmits write data together with a logical address corresponding to some data entries among the plural data entries which have been stored in the memory system, the memory system can recognize that some data entry/entries corresponding to the same logical address should be updated with the write data input from the external device.

According to an embodiment, a memory system can include a non-volatile memory device. The memory system can perform an operation such as garbage collection, wear leveling, read reclaim, and the like to secure a programmable space in the non-volatile memory device, improve a lifespan of the non-volatile memory device, or secure or improve safety or reliability of data stored in the non-volatile memory device. The operation such as garbage collection, wear leveling, and read reclaim can be performed by a command input from an external device (e.g., foreground operation) or by the memory system itself without any input command (e.g., background operation). The update event for some data entry/entries among the plural data entries can be generated during the operation such as garbage collection, wear leveling, or read reclaim.

A memory system according to an embodiment of the present disclosure can generate a parity entry by performing an exclusive-OR (XOR) operation on plural data entries and store the plural data entries and the corresponding parity entry in a non-volatile memory device. The plural data entries and the parity entry associated with the plural data entries can be programmed in units of super memory blocks. The super memory block can be constituted with plural memory blocks, each memory block included in a corresponding memory region of a plurality of memory regions (e.g., a memory die, a memory plane, or etc.). Each of the plurality of memory regions can independently or individually perform a data input/output operation, so that the memory device can perform plural data input/output operations in parallel (e.g., an interleaving mode/scheme). Even if an error (e.g., UECC error) occurs in a data entry among the plural data entries, the memory system can use a parity entry and an errored data entry for restoring or recovering an errored data entry based on an error correction code algorithm (e.g., chip-kill decoding, etc.).

A controller configured to control a data input/output operation of a memory device can perform a write operation regarding at least some (e.g., a part) of the plural data entries. To reduce a write amplification factor (WAF), the controller may not update the remaining data entries when some data entry/entries among the plural data entries is/are updated. The controller can perform a read operation or a write operation in a super memory block unit. Typically, when the super memory block includes 10 memory blocks, 10 data entries are read from or programmed in the respective 10 memory blocks. However, when an update of some data entries among the plural data entries is requested, a read operation and a write operation could be performed in units of memory blocks, not in a super memory block unit. Increasement in a write amplification factor (WAF) of the non-volatile memory device could be reduced by updating some, not all, of the plural data entries in the super memory block.

The memory system can select at least one memory block in an ascending order of program-erase cycles (P/E Cycles) in response to a size of some data entries being updated (operation 810) and allocate a memory block having the least program-erase cycles (P/E Cycles) for storing a new parity entry which is newly generated based on an updated data entry (operation 812). When some data entries among the plural data entry are updated, a previous parity associated with the plural data entries regardless of the updated data entry can become no longer valid. The controller can generate a new parity entry based at least on the updated data entry, an old data entry corresponding to the updated data entry, and an old parity entry. While storing the updated data entry in the memory device, the memory system can store the new parity entry in the memory device. Whenever some data entries among the plural data entries are updated, the memory system can generate a new parity entry and store the new parity entry in the memory device. When a memory area or memory region for storing a parity entry is fixed in the memory device, program-erase cycles (P/E Cycles) of the corresponding memory area or memory region could be rapidly increased as compared 1s with other memory areas or memory regions. In an embodiment, before storing the new parity entry, a memory system can determine a location where the new parity entry is to be stored or change a location for storing a parity entry. For example, the memory system can select a memory area or a memory region having the least program-erase cycle among plural memory areas or plural memory regions where the updated data entry and the new parity entry are updated. Through this operation, the memory system can avoid excessive increase of program-erase cycles (P/E Cycles) regarding a specific memory area or memory region among plural memory areas or memory regions included in the memory device.

The memory system can allocate a memory area or a memory region in which a previous parity entry has been stored for storing the updated data entry (operation 814). According to an embodiment, memory areas or memory regions in which the updated data entry and the parity entry are stored can be exchanged with each other. For example, program-erase cycles (P/E Cycles) of a memory block in the memory area or the memory region where the previous parity entry is stored may not be less than program-erase cycles (PIE Cycles) of other memory blocks in other memory areas or memory regions, constituting a same super memory block, where an old data entry has been stored. When the program-erase cycles (PIE Cycles) of the memory block in the memory area or the memory region where the previous parity entry is stored is not the least among other memory blocks in other memory areas or memory regions in the super memory block, the new parity entry could be stored in another memory area or another memory region where an old data entry corresponding to the updated data entry is stored.

For another example, memory areas or memory regions in which the updated data entry and the new parity entry are stored may not be changed. For example, the program-erase cycles (P/E Cycles) of the memory block in the memory area or memory region where the previous parity entry is stored could be lesser than the program-erase cycles (P/E Cycles) of other memory blocks in other memory areas or memory regions constituting a same super memory block. When the program-erase cycles (P/E Cycles) of the memory block in the memory area or the memory region where the previous parity entry is stored is the least among other memory blocks in other memory areas or memory regions in the super memory block, the new parity entry could be stored in the memory area or the memory region in which the previous parity entry is stored.

According to an embodiment, the memory system can change memory areas or memory regions in which the updated data entry and the new parity entry are stored. For example, the program-erase cycles (P/E Cycles) of the memory block in the memory area or memory region where the previous parity entry is stored could be equal to program-erase cycles (PIE Cycles) of another memory block in another memory area or memory region where the old data entry is stored. In this case, the new parity entry can be stored in another memory area or memory region, which is different from the memory area in which the previous parity entry has been stored.

The memory system can update the new parity entry as well as an entry or information in the map data regarding some updated data entry. For example, the map data can include plural entries, each entry for associating a logical address and a physical address, regarding a plurality of data entries, and at least one indicator with a physical address for indicating a parity entry. The memory system can update a location where the new parity entry is stored (operation 816), as well as update a location of some updated data entries. The memory system may not change logical addresses and physical addresses regarding remaining data entries that are not updated among the plurality of data entries in the map data. After map data update, the memory system can terminate determination of locations for storing the updated partial data entry and the new parity entry (operation 818).

When location determination is terminated (operation 818), the memory system can program the updated partial data entry and the new parity entry in a memory block in selected memory regions or areas. When the partial data entry and the new parity entry are programmed, map information can be stored in the memory device.

Hereinafter, an operation of the above-described memory system will be described in detail with reference to FIGS. 2 to 10. Specifically, a controller included in the memory system will be described with reference to FIGS. 2 to 4, and a non-volatile memory device included in the memory system will be described with reference to FIGS. 5 and 6, Further, a system and a scheme for distributing and storing a plurality of data entries and a parity entry in a memory device will be described with reference to FIGS. 7 and 8.

Figure 2:
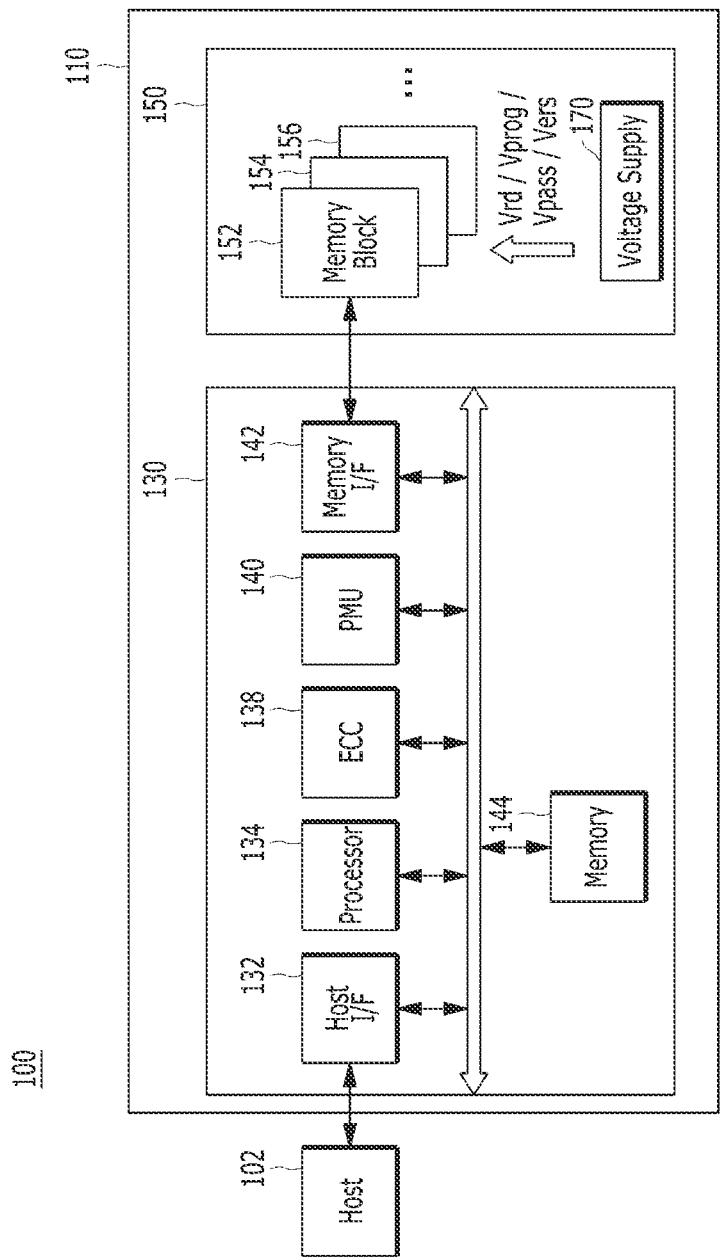
FIG. 2 illustrates a data processing system according to another embodiment of the present disclosure.
Figure 3:
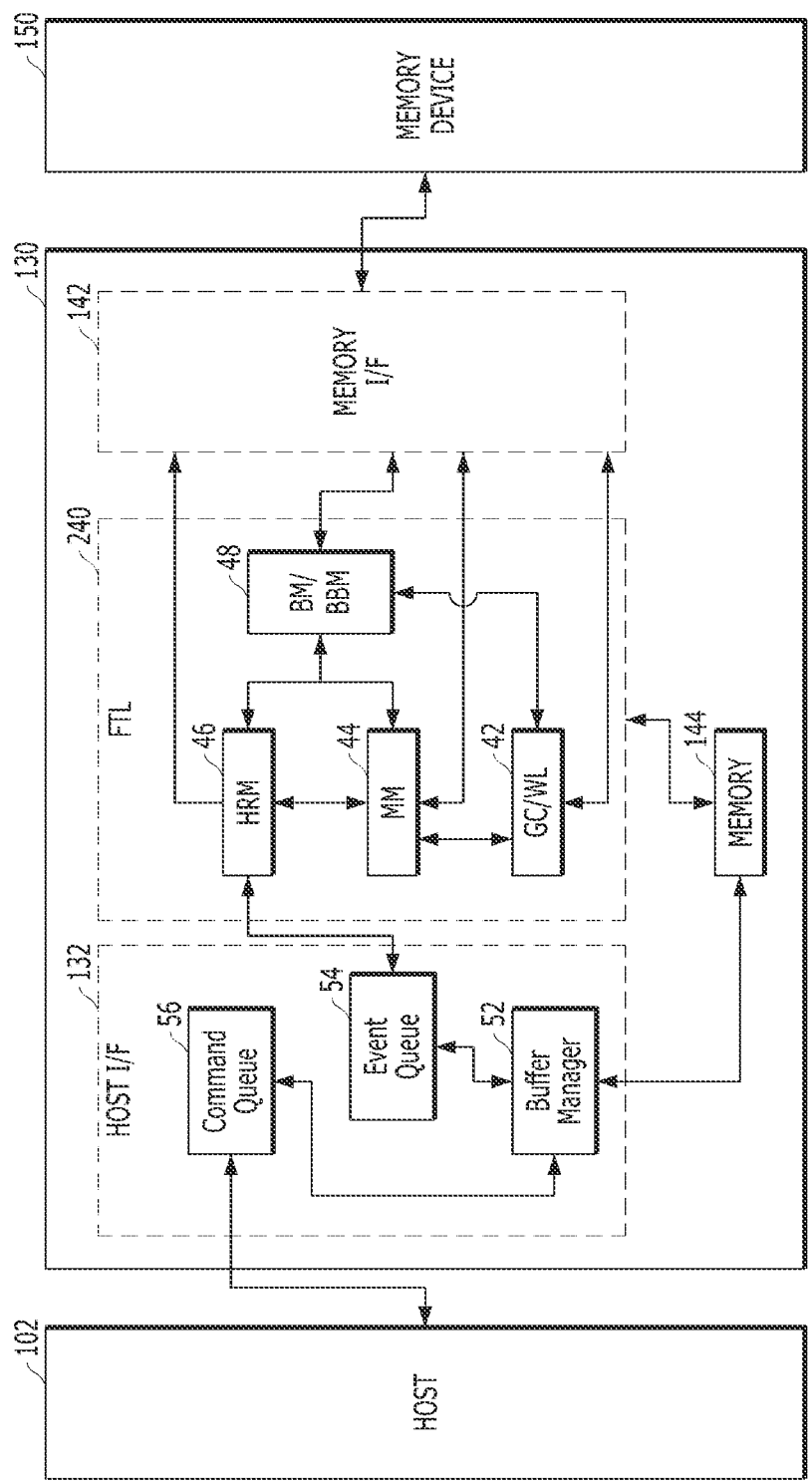
FIG. 3 illustrates a memory system according to another embodiment of the present disclosure.

FIGS. 2 and 3 illustrate some operations that nay be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 2, the memory device 150 may include a plurality of memory blocks 152, 154, 156. The memory blocks 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIGS. 1 and 2 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell, During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell, During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data entry may be required. The memory device 150 may include a table including information corresponding to plural levels of the read voltage Vrd, corresponding to the multi-bit data entry. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device, e.g., a mobile phone, an MP3 player, a laptop computer, etc., or a non-portable electronic device, e.g., a desktop computer, a game player, a television, a projector, etc.

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102, The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility, e.g., a power saving function. The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, the error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like, Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (DATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed, Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data entries. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes.

For example, the ECC decoder may perform hard decision decoding or soft decision decoding on data transmitted from the memory device 150, The hard decision decoding can be understood as one of two methods broadly classified for error correction. The hard decision decoding may include an operation of correcting an error bit by reading digital data of '0' or '1' from a non-volatile memory cell the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values, e.g., multiple bit data, approximate values, an analog value, and the like, in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. In the hard decision decoding, a value output from a non-volatile memory cell is decoded as 0 or 1. Compared to the hard decision decoding, the soft decision decoding can determine the yak e stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding, A Log Likelihood Ratio (LLR) may be calculated as a non-linear function for a distance between a sampled value and an ideal value. In addition, a Turbo Code (TC) may include a simple code, for example, a Hamming code, in two or three dimensions and repeat decoding in a row direction and a column direction to improve reliability of values.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130, The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150, For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130, For example, the memory 144 may temporarily store read data entries output from the memory device 150 in response to a read request from the host 102 before the read data entries are output to the host 102. In addition, the controller 130 may temporarily store write data entries input from the host 102 in the memory 144 before programming the write data entries in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data entries or write data entries, the memory 144 may store information, e.g., map data, read requests, program requests, etc. used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved, According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Background operations that can be performed without a command transmitted from the host 102 by the controller 130 include garbage collection (GC), wear leveling (WO, bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes.

Such a processing method or scheme can be considered to be an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150, The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156, Each of the plurality of memory blocks 152, 154, 156 includes a plurality of non-volatile memory cells, According to an embodiment, the memory block 152, 154, 156 can be a group of non-volatile memory cells erased together. The memory block 152, 154, 156 may include a plurality of pages which is a group of non-volatile memory cells read or programmed together.

In an embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156, A configuration of the memory device 150 may be changed depending on performance of the memory system 110.

FIG. 2 illustrates the memory device 150 includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data, e.g., two or more bits of data. The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block can be slower than that of the SLC memory block, That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored 1-bit data.

In an embodiment, the memory device 150 is embodied as a non-volatile memory such as a flash memory, for example, a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240, In another embodiment, the error correction circuitry 138 may be implemented as a separate module, a circuit, firmware, or the like, which is included in or associated with the controller 130.

The host interface 132 may handle commands, data, and the like transmitted from the host 102, By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110, The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150, In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (FIRM) 46 or the state manager 42. The map manager 44 may store the entire map table in the memory device 150, e.g., a flash/non-volatile memory, and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (FIRM) 46 may program the latest version of the data for the same logical address of the page and concurrently issue an update request. When the state manager 42 requests the map update in a state in which the copying of the valid page(s) is not completed normally, the map manager 44 may not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
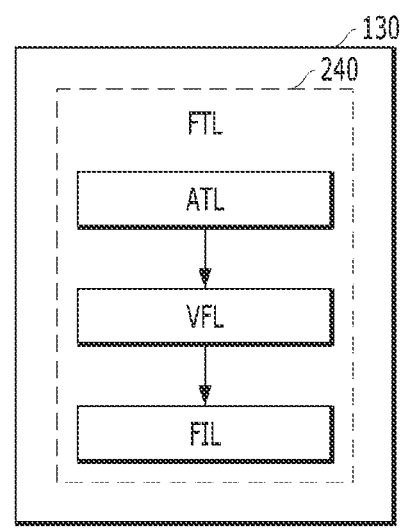
FIG. 4 illustrates internal configuration included in a controller shown in FIGS. 1 to 3 according to an embodiment of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information in which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA, Here, the virtual page address VPA may correspond to a physical address of a virtual memory device. That is, the virtual page address VPA may correspond to the memory block 60 in the memory device 150, If there is a bad block among the memory blocks 60 in the memory device 150, the bad block may be excluded by the virtual flash layer VFL, In addition, the virtual flash layer VFL can include a recovery algorithm for scanning a scan area to restore the logical-to-virtual address flapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150, For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
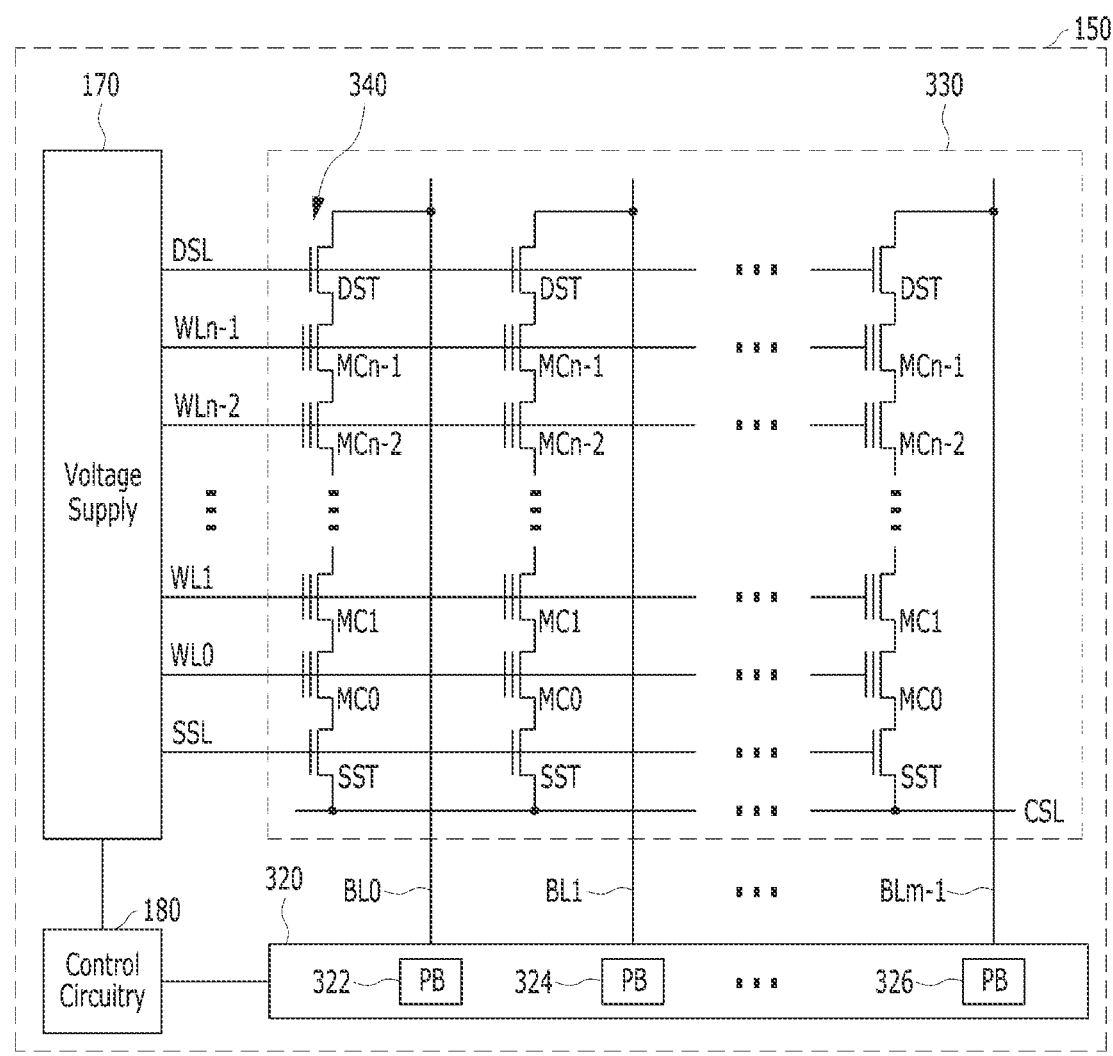
FIG. 5 illustrates a memory device according to an embodiment of the present disclosure.

FIG. 5 illustrates a memory device according to an embodiment of the present disclosure. Specifically, FIG. 5 schematically illustrates a memory cell array circuit in a memory die or memory plane included in the memory device 150 according to an embodiment of the present disclosure.

Referring to FIG. 5, the memory device 150 may include at least one memory group 330 having a plurality of cell strings 340. Each cell string 340 may include a plurality of non-volatile memory cells MC0 to MCn−1 connected to a respective bit line of a plurality of bit lines BL0 to BLm−1. The cell strings 340 are disposed in respective columns of the memory group 330, and each cell string 340 can include at least one drain select transistor DST and at least one source select transistor SST. The non-volatile memory cells MC0 to MCn−1 of each cell string 340 may be connected in series between a drain select transistor DST and a source select transistor SST, Each of the non-volatile memory cells MC0 to MCn−1 may be configured as a mufti-level cell (MLC) that stores a data entry having plural bits per cell. The cell strings 340 may be electrically connected to corresponding bit lines of the bit lines BL0 to BLm−1.

In the embodiment shown in FIG. 5, the memory group 330 may include NAND-type flash memory cells MC0 to MCn−1, In another embodiment, the memory group 330 can be implemented as a NOR-type flash memory, a hybrid flash memory in which at least two different types of memory cells are nixed or combined, or a one-chip NAND flash memory in which a controller is embedded in a single memory chip. In an embodiment, the memory group 330 can include a flash memory cell including a charge trap flash (CTF) layer that includes a conductive floating gate or insulating layer.

FIG. 5 shows an embodiment of a memory system 110 which may include the memory device 150, In this embodiment, the memory group 330 in memory device 150 may include one or more memory blocks 152, 154, 156, According to an embodiment, the memory device 150 can have a two-dimensional (2D) or three-dimensional (3D) structure. For example, each of the memory blocks 152, 154, 156 in the memory device 150 may be implemented as a 3D structure or a vertical structure, Each of the memory blocks 152, 154, 156 may have a three-dimensional structure extending along first to third directions, for example, an x-axis direction, a y-axis direction, and a z-axis direction.

The memory group 330 including the plurality of memory blocks 152, 154, 156 can be coupled to a plurality of bit lines BL, a plurality of string select lines SSL, and a plurality of drain select lines DSL, a plurality of word lines WL, a plurality of dummy word lines DWL, and a plurality of common source lines CSL. In an embodiment, the memory group 330 can include a plurality of NAND strings NS which, for example, may respectively correspond to cell strings 340. Each NAND string NS may include a plurality of memory cells MC and may be connected to a respective bit line of the bit lines BL. In addition, the string select transistor SST of each NAND string NS may be connected to a common source line CSL, and the drain select transistor DST of each NAND string NS can be connected to a corresponding bit line BL. In each NAND string NS, the memory cells MC may be arranged between the string select transistor SST and the drain select transistor DST.

Referring to FIG. 5, the memory device 150 can include a voltage supply circuit 170 which can supply a word line voltage e.g., one or more predetermined voltages such as a program voltage, a read voltage, and a pass voltage, for respective word lines according to an operation mode, or may supply a voltage to a bulk (e.g., a well region) in which each memory block including the memory cells MC are formed. In this case, a voltage generating operation of the voltage supply circuit 170 may be performed under a control of a control circuitry 180, Also, the voltage supply circuit 170 may generate a plurality of variable read voltages to distinguish a plurality of data entries from each other. The plurality of variable read voltages can be applied to non-volatile memory cells in the memory group 330.

In response to the control of the control circuit, one of the memory blocks (or sectors) of the memory cell array may be selected, and one of the word lines of the selected memory block may be selected. Word line voltages may be supplied to the selected word line and the unselected word line, individually. The voltage supply circuit 170 may include a voltage generation circuit (e.g., refer to FIGS. 6 to 8) for generating target voltages having various levels.

In an embodiment, the voltage supply circuit 170 may be coupled to a first pin or pad receiving a first power voltage VCC applied from the outside (e.g., an external device) and a second pin or pad receiving the second power voltage VPP applied from the external device. The second power voltage VPP may have a greater voltage level, e.g., twice or higher than that of the first power voltage VCC. For example, the first power voltage VCC may have a voltage level of 2.0V to 5.5V, while the second power supply voltage may have a voltage level of 9V to 13V.

According to an embodiment, the voltage supply circuit 170 can include a voltage generation circuit for more rapidly generating the target voltages of various levels used in the memory group 330. The voltage generation circuit can use the second power supply voltage VPP to generate a target voltage, which may have a higher voltage level than the second power voltage VPP.

The memory device 150 may also include a read/write circuit 320 controlled by the control circuitry 180. The read/write circuit 320 may operate as a sense amplifier or a write driver according to an operation mode. For example, in a verify operation and a read operation, the read/write circuit 320 may operate as a sense amplifier for reading the data entry from the memory cell array. In a program operation, the read/write circuit 320 may operate as a write driver that controls potentials of bit lines according to a data entry to be stored in the memory cell array. The read/write circuit 320 may receive the data entry to be programmed to the cell array from page buffers during the program operation. The read/write circuit 320 can drive bit lines based on the input data entry. To this end, the read/write circuit 320 may include a plurality of page buffers (PB) 322, 324, 326, with each page buffer corresponding to each column (or each bit line) or each column pair (or each bit line pair). According to an embodiment, a plurality of latches may be included in each of the page buffers 322, 324, 326.

The page buffers 322, 324, 326 may be coupled to a data input/output device (e.g., a serialization circuit or a serializer) through a plurality of buses BUS. When each of the page buffers 322, 324, 326 is coupled to the data input/output device through different buses, a delay that may occur in data transmission from the page buffers 322, 324, 326 can be reduced. For example, each page buffer 322, 324, 326 can perform the data transmission without a waiting time. According to an embodiment, the input/output device can be included in an input/output control circuit 380 described with reference to FIG. 6. Further, the page buffers 322, 324, 326 described with reference to FIG. can include a data register 254 described with reference to FIG. 6.

According to an embodiment, the memory device 150 may receive a write command, write data entries, and information (e.g., a physical address) regarding a location in which the write data entries R) are to be stored. The control circuitry 180 causes the voltage supply circuit 170 to generate a program pulse, a pass voltage, etc., used for a program operation performed in response to a write command, and to generate one or more voltages used for a verification operation performed after the program operation.

When a multi-bit data entry is programmed in non-volatile memory cells included in the memory group 330, the error rate may be higher than that when a single-bit data entry is stored in the non-volatile memory cells. For example, an error in the non-volatile memory cells may be induced due to cell-to-cell interference (CCI). In order to reduce error in the non-volatile memory cells, a width (deviation) of a threshold voltage distribution corresponding to stored data entries between the non-volatile memory cells, should be reduced.

To this end, the memory device 150 can perform an incremental step pulse programming (ISPP) operation to effectively make a narrow threshold voltage distribution of the non-volatile memory cells. In an embodiment, the memory device 150 can use the ISPP operation for multi-step program operations. For example, the memory device 150 may divide a program operation into a Least Significant Bit (LSB) program operation and a Most Significant Bit (MSB) operation according to a predetermined order between the non-volatile memory cells or pages.

Figure 6:
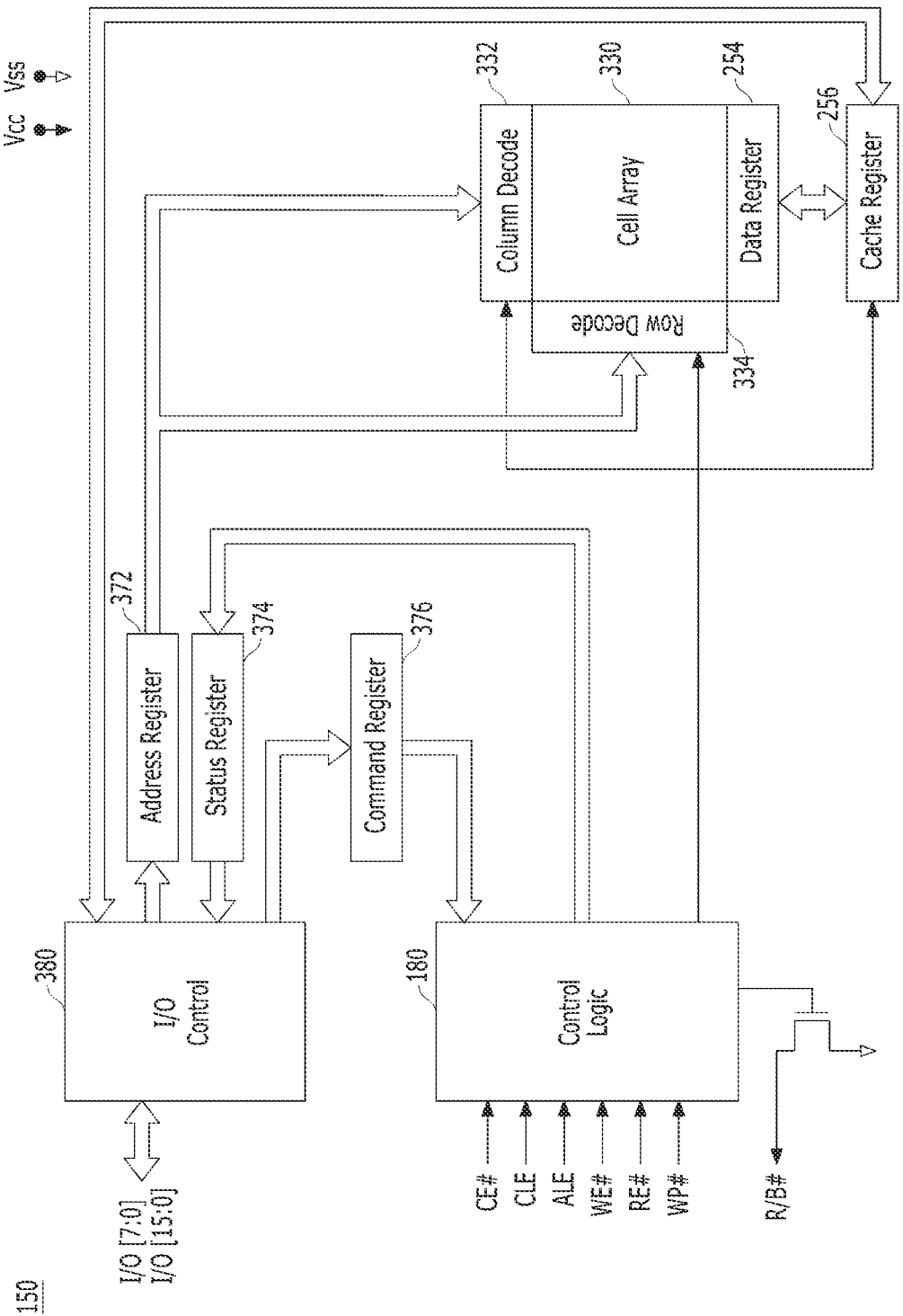
FIG. 6 illustrates a memory device according to another embodiment of the present disclosure.

FIG. 6 illustrates a memory device according to another embodiment of the present disclosure, Specifically, FIG. 6 describes a memory die included in the memory device 150.

Referring to FIG. 6, the memory device 150 can include at least one memory die. The memory device 150 can receive/output a plurality of control signals CE #, CLE, ALE, WE #, RE #, WP #, R/B #, and receive or transmit data or operation information through channels I/O[7:0], I/O[15:0]. For example, 1 byte (8 bits) of data or 2 bytes (16 bits) of data can be transmitted and received according to the width of the channel I/O[7:0], I/O[15:0] connecting the memory device 150 and the controller 130.

According to an embodiment, the memory device 150 can include a plurality of pins or pads. For example, the plurality of control signals CE #, CLE, ALE, WE #, RE #, WP #, R/B #can be transmitted or received through exclusively allocated pins. The plurality of control signals CE #, CLE, ALE, WE #, RE #, WP #, R/B #can include a chip enable signal CE #, a command latch enable signal CLE, an address latch enable signal ALE, a write enable signal WE #, a read enable signal RE #, a write protect signal WP #, a status signal R/B #indicating a ready state or a busy state, and the like. The plurality of control signals CE #, CLE, ALE, WE #, RE #, WP #, R/B #can be controlled (transmitted/received) by the control circuit 180 in the memory device 150.

The memory device 150 can include the input/output control circuit 380. The input/output control circuit 380 can be connected to other devices or components (e.g., the controller 130 refer to FIGS. 2 to 3 through the channels I/O[7:0], I/O[15:0]). The input/output control circuit 380 in the memory device 150 can be coupled to a plurality of registers 372, 374, 376 and a cache register 256 coupled to the cell array 330. The cell array 330 is described in FIG. 6 can include the plurality of memory blocks 152, 154, 156 shown in FIG. 2 or a plurality of memory planes PLN0, PLN1, PLN2, PLN3 described with reference to FIG. 8.

According to an embodiment, the memory device 150 may include the cache register 256, an address register 372, a status information register 374, and an instruction register 376. The cache register 256 can temporarily store data. When the memory device 150 performs a read operation, the cache register 256 can store a read data entry output from the cell array 330. When the memory device 150 performs a write operation or a program operation, the cache register 256 can store a write data entry. The address register 372 can store an address indicating a location where a read operation or a write operation is to be performed. The command register 376 can store a command to be executed by the memory device 150. The status information register 374 can store status information such as a result (failure/success) of an operation performed in the memory device 150 or whether to be ready for performing an operation. For example, when a plurality of memory planes (refer to FIG. 8) are included in a memory die included in the memory device 150, the state information register 374 can store state information regarding each of the plurality of memory planes. Data, commands, information, and etc. transmitted or received through the input/output control circuit 380 in the memory device 150 can be controlled (e.g., transmitted, moved, or output) by the control device 180.

For example, during a read operation in the memory device 150, a row decoder 334 and a column decoder 332 can select some memory cells in the cell array 330 based on an address stored in the address register 372 and a control signal from the control circuit 180. A read data entry output from the cell array 330 may be stored in the data register 254 and then transferred from the data register 254 to the cache register 256 during a read operation. The read data entry stored in the cache register 256 is transferred to the input/output control circuit 380 through input/output lines. The read data entry transmitted to the input/output control circuit 380 can be output to the controller 130 through the channels I/O[7:0], I/O[15:0].

For another example, during a write operation or a program operation in the memory device 150, the row decoder 334 and the column decoder 332 can select some memory cells in the array 330 in response to an address stored in the address register 372 and a control signal from the control circuit 180. During the write operation, the write data entry transferred from the controller 130 to the input/output control circuit 380 through the channels I/O[7:0], I/O[15:0] can be stored in the cache register 256. Thereafter, the write data entry can be transferred from the cache register 256 to the data register 254. The write data entry stored in the data register 254 can be programmed in selected memory cells in the cell array 330 by the control circuit 180.

The data register 254 and the cache register 256 described with reference to FIG. 6 can be included in the read/write circuit 320 described with reference to FIG. 5. According to an embodiment, the page buffers 322, 324, 326 described with reference to FIG. 5 can correspond to the data register 254 and/or the cache register 256 described with reference to FIG. 6.

Figure 7:
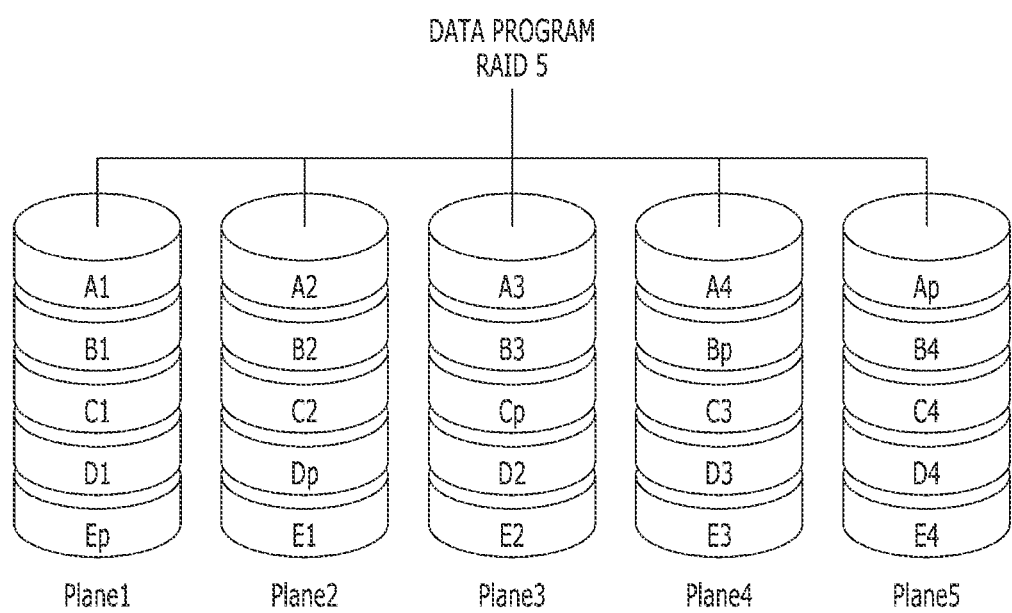
FIG. 7 illustrates a data storage technology such as RAID (redundant array of inexpensive disks or "redundant array of independent disks") in accordance with an embodiment of the present disclosure.

FIG. 7 illustrates a data storage technology such as RAID (redundant array of inexpensive disks or "redundant array of independent disks") in accordance with an embodiment of the present disclosure. The redundant array of independent (or inexpensive) disks (RAID) is a scheme applicable to a memory device in accordance with an embodiment of the present disclosure. Specifically, FIG. 7 shows an example of using five regions Plane1, Plane2, Plane3, Plane4, Plane5 in a Redundant Array of Independent Disk (RAID) or a Redundant Array of Inexpensive Disk (RAID).

Five regions included in the memory device using a RAID scheme can have substantially a same size. According to an embodiment, each of the five regions Plane1, Plane2, Plane3, Plane4, Plane5 included in the memory device 150 can include a memory plane, a memory block, a memory die, or the like. In another embodiment, the five regions Plane1, Plane2, Plane3, Plane4, and Plane5 can be five logical regions established by a user.

The memory system 110 can use the RAID scheme to store 4 pieces of data A1, A2, A3, A4 and 1 parity Ap in five regions Plane1, Plane2, Plane3, Plane4, Plane5. Even if an error occurs in one region of the five regions Plane1, Plane2, Plane3, Plane4, Plane5, data stored in an errored region can be recovered and restored based on the other pieces of data and the parity stored in the remaining four regions. For example, the parity Ap can be generated by an exclusive-OR (XOR) logical operation on the four pieces of data A1, A2, A3, A4. Thereafter, when an error occurs in a second piece of data A2 among the four pieces of data A1, A2, A3, A4, the second data A2 can be recovered and restored by an exclusive-OR (XOR) operation on first, third, and fourth pieces of data A1, A3, A4 and the piece of parity Ap.

In addition, because it is difficult to predict at which region among the five regions Plane1, Plane2, Plane3, Plane4, Plane5 a problem will occur, locations for storing four pieces of data and one piece of parity can be changed. For example, one piece of first parity Ap corresponding to the four pieces of first data A1, A2, A3, A4 can stored in a fifth region Plane5, but one piece of second parity Bp corresponding to four pieces of second data B1, B2, B3, B4 can be stored in a fourth space Plane4.

Referring to FIGS. 2 and 7, in the five regions Plane1, Plane2, Plane3, Plane4, Plane5 of the memory device 150, four pieces of first data A1, A2, A3, A4 and one piece of first parity Ap can be programmed. The controller 130 described with reference to FIG. 2 may generate one piece of first parity Ap based on the four pieces of first data A1, A2, A3, A4. In the memory system 110, four pieces of first data A1 A2, A3, A4 and one piece of first parity Ap can be stored in different memory regions. In order to program the multi-bit data, when the memory device 150 according to an embodiment of the present disclosure can perform a two-step program operation, a parity can be generated and stored in the RAID scheme. In this case, the controller 130 can reduce a write buffer size of the SLC buffer or the memory 144 described in FIG. 2 for improving resource efficiency.

Figure 8:
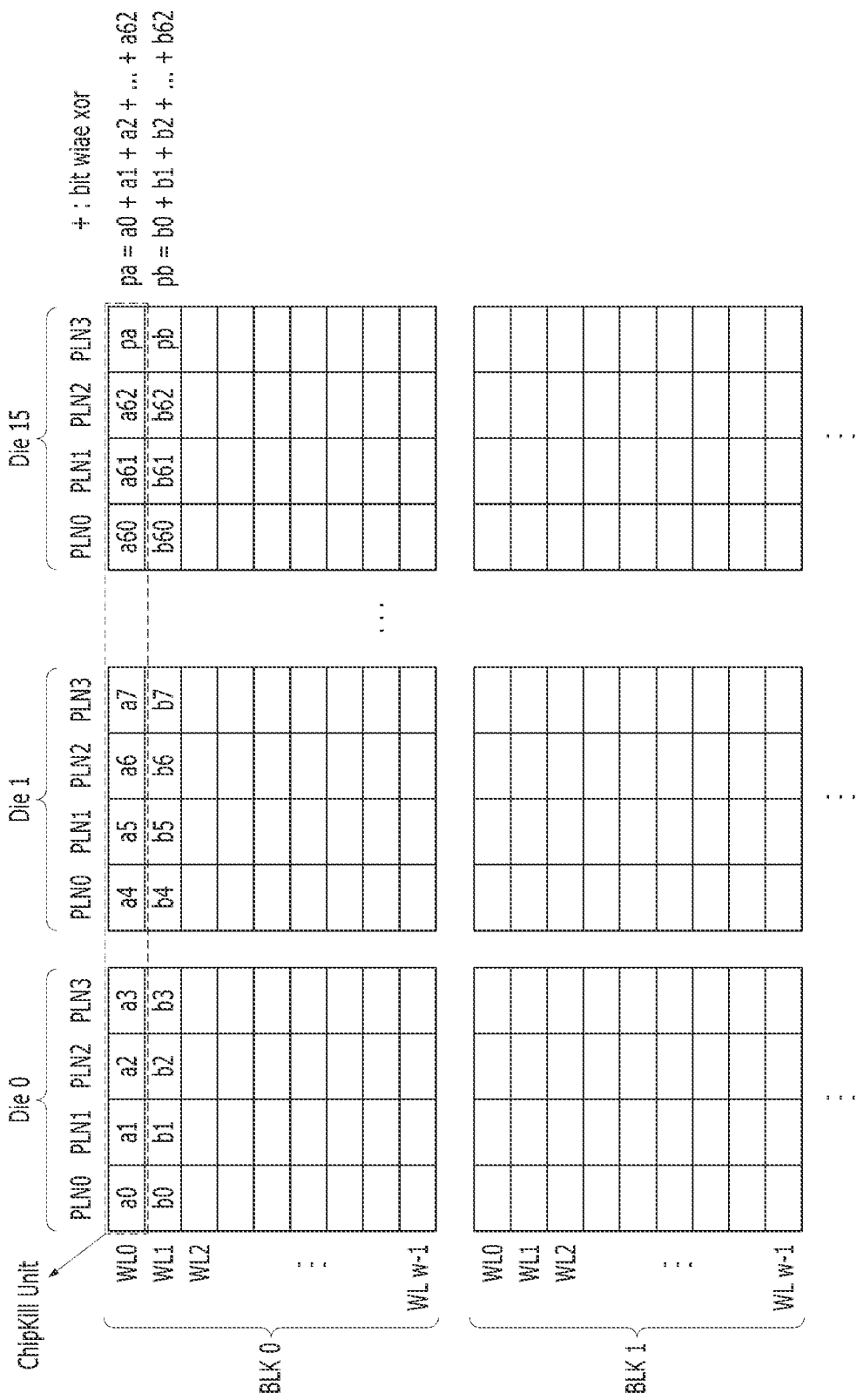
FIG. 8 illustrates a super block scheme for storing data in a memory device according to an embodiment of the present disclosure.

FIG. 8 illustrates a super block scheme for storing data in a memory device according to an embodiment of the present disclosure.

Referring to FIG. 8, the memory device 150 can include a plurality of memory dies Die0, Die1, Die15. Each memory die Die0 to Die15 can include four memory planes PLN0, PLN1, PLN2, PLN3. Each of the memory planes PLN0, PLN1, PLN2, PLN3 can include a plurality of memory blocks BLK0, BLK1, . . . , and each of the memory blocks BLK0, BLK1, . . . can include a plurality of memory cells connected to a plurality of word lines WL0, WL1, WL2, . . . , WLw−1.

According to an embodiment described with reference to FIG. 2, the non-volatile memory cell can store multi-bit data. However, for convenience of description, FIG. 8 shows, as an example, the memory device 150 for storing a single data entry a0, a1, a2, . . . , a61, a62 or a single parity entry pa, pb in plural memory cells coupled to each word line in each memory region or area.

In order to improve a speed of the data input/output operation performed in the memory system 110, the memory system 110 can read or program plural data entries having a preset size together or in parallel. The speed of the data input/output operation can be improved through an interleaving mode in which plural data entries of a preset size are read or programmed in parallel in plural memory areas or regions in which the data input/output operation can be performed independently or individually. In FIG. 8, data input/output operations can be independently or individually performed in each of the memory planes PLN0, PLN1, PLN2, PLN3.

Referring to FIG. 8, the memory system 110 can program 63 first data entries a0, a1, a2, . . . , a61, a62 into a memory block included in 63 memory areas or regions (e.g., memory planes). In addition, the memory system 110 can calculate and generate a first parity entry pa based on the 63 first data entries a0, a1, a2, . . . , a61, a62, and program the first parity entry pa in a memory area or regions other than the 63 memory areas or regions. The memory system 110 may distribute and store the 63 first data entries a0, a1, a2, . . . , a61, a62 and the first parity entry pa in 64 memory areas or regions. Specifically, the 63 first data entries a0, a1, a2, ..., a61, a62 and the first parity entry pa can be programmed into memory cells connected to a first word line WL0 of a first memory block BLK0 included in 64 memory regions or areas. Further, the memory system 110 can calculate a second parity entry pb for 63 second data entries b0, b1, b2, ..., b61, b62, distributed and stored in plural memory cells connected to a second word line WL1 of the first memory block BLK0 included in the 64 memory areas or regions.

Herein, 63 data entries and one parity entry can constitute a ChipKill decoding unit. Referring to FIGS. 2 and 7, even if an error (e.g., UECC) occurs in one of the 63 data entries, the memory system 110 can recover and restore an errored data entry based on the parity entry and the 63 data entries.

The first memory block BLK0 included in the 64 memory areas may be an open memory block in the 64 memory areas or regions. Referring to FIG. 8, when data entries are stored in the memory device 150, the first memory block BLK0 may be an open memory block in each of the 64 memory planes PLN0, PLN1, PLN2, PLN3. For convenience of description, an example in which 63 data entries and a parity entry are individually stored in plural locations corresponding to a same physical block address and offset (page address) in each memory area or region will be described in FIG. 8 for convenience of description.

However, while the memory system 110 repeatedly performs the data input/output operations, a physical block address and an offset (page address) of the open memory block, which constitutes a super memory block that stores a plurality of data entries in each memory area or region (e.g., a memory plane) of the memory device 150, can be different. For example, while garbage collection is performed, some memory blocks constituting a super memory block could be targeted or victimized so that valid data entries are copied to another memory block. Then, a physical block address of a memory block constituting a super memory block in each memory area or region could be changed. Among a plurality of data entries constituting a single ChipKill decoding unit after the garbage collection, a first data entry could be still stored in memory cells coupled to a first word line WL0 of a first memory block BLK0 in a first memory plane PLN0 in a first memory die Die0, and a 63rd data entry constituting the same ChipKill decoding Unit could be stored in memory cells connected to a first word line WL0 of a second memory block BLK1 in a third memory plane PLN2 of a 16th memory die Die15.

According to an embodiment, when the memory system 110 always reads, writes, or erases a plurality of data entries in a super memory block unit, locations in which a ChipKill decoding unit including a plurality of data entries and a parity entry is stored may not be changed in a plurality of memory areas or regions in the memory device 150. For example, first and second locations in which first and second data entries among a plurality of data entries in a ChipKill decoding unit is stored has a same block address and a same offset in different memory areas and regions. When the host 102 transfers a command to update or newly store only some data entries among the plurality of data entries included in a ChipKill decoding unit, the memory system 110 should read, write, and erase all of the plurality of data entries in the ChipKill decoding unit (e.g., a read, write, or erase operation is performed in a super memory block unit), so that other data entries that are not updated among the plurality of data entries included in the same ChipKill decoding unit should also be programmed in new locations in the memory device 150 even though the other data entries are not updated. In this case, a write amplification factor (WAF) of the memory system 110 can greatly increase, as compared with a memory system 110 supporting a partial data update in a super memory block scheme.

In order to reduce the write amplification factor (WAF) of the memory system 110 or to effectively manage resources in the memory system 110, the memory system 110 according to an embodiment of the present disclosure can generally read a plurality of data entries in a super memory block unit, but, when only some data entries among the plurality of data entries in a same super memory block are updated, only partial data (e.g., updated data entry and renewed parity entry) in the same super memory block could be read from or programmed in the memory device 150. In this case, a plurality of data entries and a parity entry, constituting each ChipKill decoding unit or each super memory block, could be stored at different physical locations (e.g., physical block address and offset) in each of a plurality of memory areas or regions (e.g., a memory plane) in the memory device 150. For a partial data update, the memory system 110 can determine a location for storing some updated data entries and a newly calculated parity entry through the method for operating the memory system described with reference to FIG. 1.

Figure 9:
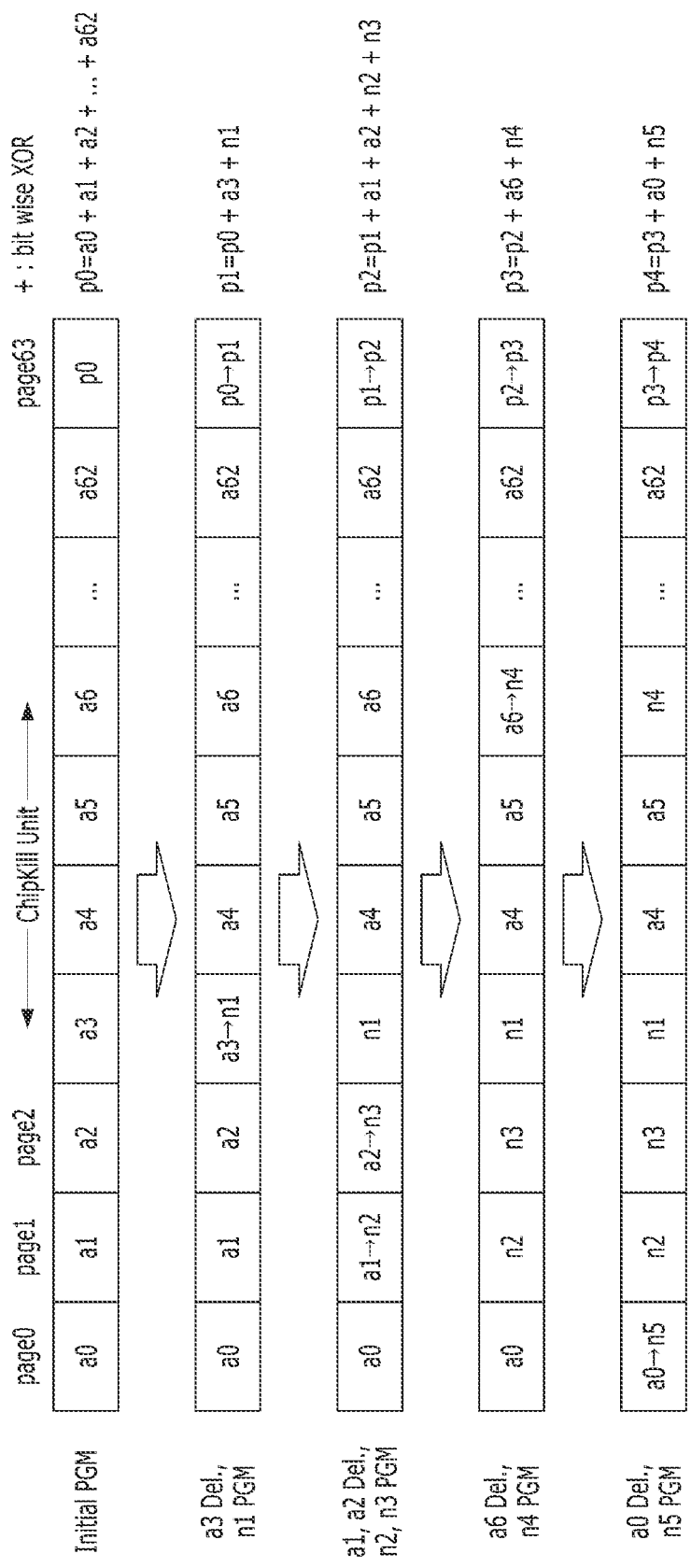
FIG. 9 illustrates where a location for storing a parity is not changed according to an embodiment of the present disclosure.

FIG. 9 illustrates an embodiment where a location for storing a parity is not changed. Specifically, FIG. 9 shows an issue when a location for storing a parity entry is not changed. When an update event occurs for some data entries among a plurality of data entries constituting a ChipKill decoding unit in the memory system 110, only some updated data entries, not all of the plurality of data in the same ChipKill decoding unit, are stored in the memory device 150. In this embodiment shown in FIG. 9, a parity entry is renewed (or updated) based on the updated data entry, but locations for storing the parity entry as well as the plurality of data entries are not changed.

Referring to FIGS. 8 and 9, a plurality of data entries a0, a1, a2, ..., a62 and a first parity entry p0 constituting a ChipKill decoding unit (ChipKill Unit) could be stored in a preset location in a plurality of memory areas or regions in the memory device 150 (Initial PGM). According to an embodiment, the plurality of data entries a0, a1, a2, ..., a62 and the first parity p0 could be understood as a plurality of page data page0, page1, page2, ..., page63. Herein, a page may be a group of non-volatile memory cells in the memory device 150 for a read or program operation. The first parity entry p0 can be generated through a bitwise XOR operation on the plurality of data entries a0, a1, a2, a62 (p0=a1+a2+ ... +a62).

A first update event (a3 Del., n1 PGM) could be generated in response to host's command or based on a background operation performed within the memory system 110. The first update event (a3 Del., n1 PGM) can include a request of changing, with a first update data entry n1, a fourth data entry a3 among the plurality of data entries a0, a1, a2, ..., a62 constituting a ChipKill decoding unit (ChipKill Unit), i.e., erase the fourth data entry a3 and program the first update data entry n1 substituted for the fourth data entry a3 in the memory device 150. In response to the first update event, the memory system 110 can program the first update data entry n1 in an open memory block included in a memory area or region in which the fourth data entry a3 has been stored in the memory device 150. Thereafter, the memory system 110 may change a physical address of the fourth data entry a3 with a physical address of the first update data n1 in the map data regarding the plurality of data a0, a1, a2, ..., a62 (a3→n1).

Further, because a data entry among the plurality of data entries a0, a1, a2, . . . , a62 constituting the ChipKill decoding unit is changed from the fourth data entry a3 to the first update data entry n1, the first parity entry p0 which is a previous parity would be no longer valid. The memory system 110 may use a lot of resource for calculating a second parity p1, which is a new parity entry, by performing an exclusive-OR (XOR) operation on the other data entries a0, a1, a2, a4, a5, a62 and the first updated data entry n1. In order to reduce resources for calculation, the memory system 110 can perform an exclusive-OR (XOR) operation on the first parity entry p0, the fourth data entry a3 that is an old data entry, and the first update data entry n1 corresponding to the fourth data entry a3 to calculate and generate the second parity entry p1 ($p1=p0+a3+n1$). After calculating the second parity entry p1, the memory system 110 can program the second parity entry p1 in the memory device 150. In this case, if the memory area or region for storing a parity entry in the memory device 150 is not changed, the second parity entry p1 could be programmed in an open memory block included in the memory area or region in which the first parity entity p0 has been stored. Thereafter, the memory system 110 can change a physical address of the first parity entry p0 with a physical address of the second parity entry p1 in the map data (p0→p1).

A second update event (a1, a2 Del., n2, n3 PGM) can be generated. The second update event (a1, a2 Del., n2, n3 PGM) can include a request of changing a second data entry a1 and a third data entry a2 among the plurality of data entries a0, a1, a2, n1, a4, . . . , a62 with a second update data entry n2 and a third update data entry n3 (that is, the second data entry a1 and the third data entry a2 are erased, and the second update data entry n2 and the third update data entry n3 are stored or programmed instead of the second data entry a1 and the third data entry a2). In response to the second update event, the memory system 110 can program the second update data entry n2 in an open memory block included in a memory area or region in which the second data entry a1 has been stored, and program the third update data entry n3 in an open memory block included in a memory area or region in which the third data entry a2 has been stored in the memory device 150. Thereafter, the memory system 110 can change physical addresses of the second data entry a1 and the third data entry a2 with physical addresses of the second update data entry n2 and the third update data entry n3 in the map data regarding the plurality of data entries a0, a1, a2, n1, a4, . . . , a62 (a1→n2, a2→n3).

In addition, two data entries among the plurality of data entries a0, a1, a2, n1, a4, . . . , a62 constituting the ChipKill decoding unit are updated from the second data entry a1 and the third data entry a2 to the second update data entry n2 and the third update data entry n3, the second parity entry p1 generated during an operation corresponding to the first update event would become no longer valid. The memory system 110 can calculate and generate a third parity entry p2 by performing an exclusive OR operation on the second data entry a1 and the third data entry a2, i.e., old data entries, the second update data entry n2 and the third update data entry n3 corresponding to the second data entry a1 and the third data entry a2, and the second parity entry p1 ($p2=p1+a1+a2+n2+n3$). After calculating the third parity entry p2 which is renewed for the ChipKill decoding unit, the memory system 110 can be programmed into an open memory block included in the memory area or region in which the second parity entry p1 has been stored in the memory device 150, Thereafter, the memory system 110 can change the physical address of the second parity entry p1 to a physical address of the third parity entry p2 in the map data (p1→p2).

After the second update event, a third update event (a6 Del., n4 PGM) can be generated to update a seventh data entry a6 among the plurality of data entries a0, n2, n3, n1, a4, . . . , a62 with a fourth update data entry n4 (that is, erase the seventh data entry a6 and program the fourth update data entry n4 instead of the seventh data entry a6). In response to the third update event, the memory system 110 can program the fourth update data entry n4 in an open memory block included in a memory area or region in which the seventh data entry a6 has been stored in the memory device 150, Thereafter, the memory system 110 can substitute a physical address of the seventh data entry a6 with a physical address of the fourth update data entry n4 in the map data regarding the plurality of data entries a0, n2, n3, n1, a4, . . . , a62 (a6→n4).

Further, because the seventh data entry a6 among the plurality of data entries a0, n2, n3, n1, a4, . . . , a62 constituting the ChipKill unit is changed with the fourth update data entry n4, the third parity entry p2 previously generated by an operation corresponding to the second update event would become no longer valid. The memory system 110 can perform an exclusive-OR (XOR) operation on the fourth update data entry n4, the seventh data entry a6 that is previous data corresponding to the fourth update data entry n4, and the third parity entry p2 which is a previous one, in order to generate a fourth parity entry p3. Accordingly, a new parity entry, i.e., the fourth parity entry p3, can be calculated as $p3=p2+a6+n4$. After calculating the fourth parity entry p3, the memory system 110 can be programmed in an open memory block included in the memory area in which the third parity entry p2 has been stored in the memory device 150, Thereafter, the memory system 110 can change the physical address of the second parity entry p2 with a physical address of the third parity entry p3 in the map data (p2→p3).

After the third update event, a fourth update event (a0 Del., n5 PGM) can be generated. The fourth update event (a0 Del., n5 PGM) can include a request for updating a first data entry a0 among the plurality of data entries a0, n2, n3, n1, a4, a5, n4, . . . , a62 with a fifth update data entry n5 (i.e., erase the first data entry a0 and program the fifth update data entry n5 instead of the first data entry a0). In response to the fourth update event, the memory system 110 can program the fifth update data entry n5 in an open memory block included in a memory area or region in which the first data entry a0 has been stored in the memory device 150. Thereafter, the memory system 110 can change a physical address of the first data entry a0 with a physical address of the fifth update data entry n5 (a0→n5).

Further, because the first data entry a0 among the plurality of data entries a0, n2, n3, n1, a4, a5, n4, . . . , a62 constituting the ChipKill unit is changed with the fifth update data entry n5, the previous parity entry, i.e., the fourth parity entry p3, generated during an operation corresponding to the third update event would become no longer valid. The memory system 110 can perform an exclusive-OR (XOR) operation on the fifth update data entry n5, the first data entry a0 that is previous data corresponding to the fifth update data entry n5, and the fourth parity entry p3. Thus, a fifth parity entry p4 can be calculated as $p4=p3+a0+n5$, After calculating a new parity entry, i.e., the fifth parity entry p4, the memory system 110 can program the fifth parity entry p4 in an open memory block included in the memory area or region in which the fourth parity entry p3 has been stored in the memory device 150. Thereafter, the memory system 110 can change the physical address of the fourth parity entry p3 with a physical address of the fifth parity entry p4 in the map data (p3→p4).

After operations according to the first to fourth update events, a plurality of data entries n5, n2, n3, n1, a4, a5, n4, ..., a62 constituting the ChipKill unit could be partially updated and stored in partial memory areas or regions (i.e., a program operation could be performed in each of five memory areas or regions among 63 memory areas or regions for data entries), but four program operations have been performed in the memory area or region allocated for storing a parity entry. In an embodiment of the memory system 110 that does not change a location allocated for storing a parity entry, plural partial data update events could rapidly increase program-erase cycles (P/E Cycles) of the memory area or region allocated for storing the parity entry as compared with those of memory areas or regions allocated for storing data entries. When plural data entries among a plurality of data entries constituting a ChipKill decoding unit are updated several times (a time lag, not together or simultaneously), a parity entry should be renewed and stored or updated in a specific memory area or region allocated for storing a parity entry. As a result, the program-erase cycle (P/E Cycles) of the corresponding memory area or regions increases, and thus a lifespan of the memory area or region storing a parity entry could become shorter than that of other memory areas or regions.

FIG. 10 illustrates an embodiment where locations for storing a partial data entry and a parity entry are changed. FIG. 10 illustrates an operation of the memory system 110 in a same operating environment as that of FIG. 9. Although the first to fourth update events described in FIG. 10 are the same as the first to fourth update events described in FIG. 9, a location in which a parity entry calculated according to each update event is stored can be changed. For convenience of description, differences between the embodiments show in FIGS. 9 and 10 will be mainly described.

Referring to FIG. 10, the first update event (a3 Del., n1 PGM) can include a request for changing, with a first update data entry n1, a fourth data entry a3 among the plurality of data entries a0, a1, a2, ..., a62 constituting a ChipKill decoding unit (ChipKill Unit), i.e., erase the fourth data entry a3 and program the first update data entry n1 substituted for the fourth data entry a3 in the memory device 150. The memory system 110 can perform an exclusive-OR (XOR) operation on the first parity entry p0, the fourth data entry a3 that is an old data entry, and the first update data entry n1 corresponding to the fourth data entry a3 to calculate and generate the second parity entry p1 (p1=p0+a3+n1). In response to the first update event, the memory system 110 can update the fourth data entry a3 with the first update data entry n1 and the first parity entry p0 with the second parity entry p2.

Unlike the embodiment shown in FIG. 9, the memory system 110 can program the first update data entry n1 in an open memory block in a memory area or region in which the previous parity entry, i.e., the first parity entry p0, has been stored, and program the second parity entry p1, i.e., a new parity entry, in a memory area or region in which the fourth data entry a3 has been stored. Thereafter, the memory system 110 can change a logical address of the fourth data entry a3 with an indicator indicating a parity entry for the ChipKill decoding unit in the map data, as well as change a physical address of the fourth data entry a3 to a physical address of the second parity entry p1 (a3→p1). Further, the memory system 110 can change the indicator for the parity entry to a logical address of the first update data entry n1 in the map data, as well as change a physical address of the first parity entry p0 with a physical address of the first update data entry n1 (p0→n1), Through this operation, the second parity entry p1 renewed through the first update event (a3 Del., n1 PGM) can be stored in a memory area or region which is different from that storing the first parity entry p8.

The second update event (a1, a2 Del., n2, n3 PGM) can include a request of changing a second data entry a1 and a third data entry a2 among the plurality of data entries a0, a1, a2, n1, a4, ..., a62 with a second update data entry n2 and a third update data entry n3 (that is, the second data entry a1 and the third data entry a2 are erased, and the second update data entry n2 and the third update data entry n3 are stored or programmed instead of the second data entry a1 and the third data entry a2). In response to the second update event, the memory system 110 can calculate and generate a third parity entry p2 by performing an exclusive OR operation on the second data entry a1 and the third data entry a2, i.e., old data entries, the second update data entry n2 and the third update data entry n3 corresponding to the second data entry a1 and the third data entry a2, and the second parity entry p1 (p2=p1+a1+a2+n2+n3). In response to the second update event, the memory system 110 can program the second update data entry n2, the third update data entry n3, and the third parity entry p2 in open memory blocks included in memory areas or regions where the second data entry a1, the third data entry a2, and the second parity entry p1 have been stored in the memory device 150.

Herein, the memory system 110 can compare program-erase cycles (P/E Cycles) regarding open memory blocks (i.e., three open memory blocks) included in the memory areas or regions storing the second data entry a1, the third data entry a2, and the second parity entry p1. According to a comparison result, an open memory block having the least program-erase cycles (PIE Cycles) can be allocated for storing the third parity entry p2, and the remaining open memory blocks can be allocated for storing the second update data entry n2 and the third update data entry n3. Referring to FIG. 10, because the open memory block in the memory area or region in which the second data entry a1 is stored has the least PIE Cycles, the third parity entry p2 is programmed in the corresponding open memory block included in the memory area or region in which the second data entry a1 has been stored. In addition, the memory system 110 can allocate the open memory blocks in the memory areas or regions in which the third data entry a2 and the second parity entry p1 have been stored for storing the second update data entry n2 and the third update data entry n3. After the memory system 110 determines a location to store the third parity entry p2, the second update data entry n2, and the third update data entry n3, the third parity entry p2 can be programmed in the memory device 150.

The memory system 110 can change a logical address of the second data entry a1 with an indicator indicating a parity entry in the map data, as well as change a physical address of the second data entry a1 to a physical address of the third parity entry p2 (a1→p2). The memory system 110 can also change a logical address and a physical address of the third data entry a2 with a logical address and a physical address of the second update data entry n2 in the map data (a2→n1). Further, the memory system 110 can change the indicator for the parity entry to a logical address of the third update data n3, as well as changes a physical address of the second parity entry p1 with a physical address of the third update data entry n3 in the map data (p1→n3). Through this operation, the third parity entry p2 renewed through the second update events (a1, a2 Del., n2, n3 PGM) can be stored in a memory area or region which is different from that storing the second parity entry p1.

The third update event (a6 Del., n4 PGM) can be generated to update a seventh data entry a6 among the plurality of data entries a0, n2, n3, n1, a4, . . . , a62 with a fourth update data entry n4 (that is, erase the seventh data entry a6 and program the fourth update data entry n4 instead of the seventh data entry a6). In response to the third update event, the memory system 110 can perform an exclusive-OR (XOR) operation on the fourth update data entry n4, the seventh data entry a6 that is previous data corresponding to the fourth update data entry n4, and the third parity entry p2 which is a previous one, in order to generate a fourth parity entry p3 (p3=p2+a6+n4).

In response to the third update event, the memory system 110 can program the fourth update data entry n4 in an open memory block in the memory area or region in which the third parity entry p2 has been stored, and program the fourth parity entry p3 in an open memory block in the memory area or region in which the seventh data entry a6 has been stored. Thereafter, the memory system 110 can change a logical address of the seventh data entry a6 with the indicator indicating the parity entry, as well as change a physical address of the seventh data entry a6 with a physical address of the fourth parity entry p3 in the map data (a6→p3). Also, the memory system 110 can change the indicator for the parity entry with a logical address of the fourth update data entry n4, as well as changes the physical address of the third parity entry p2 with a physical address of the fourth update data entry n4 in the map data (p2→n4). Through this operation, the fourth parity entry p3 changed through the third update event (a6 Del., n4 PGM) can be stored in a memory area or region which is different from that storing the third parity entry p2.

The fourth update event (a0 Del., n5 PGM) can include a request for updating a first data entry a0 among the plurality of data entries a0, n2, n3, n1, a4, a5, n4, . . . , a62 with a fifth update data entry n5 (i.e., erase the first data entry a0 and program the fifth update data entry n5 instead of the first data entry a0). In response to the fourth update event, the memory system 110 can perform an exclusive-OR (XOR) operation on the fifth update data entry n5, the first data entry a0 that is previous data corresponding to the fifth update data entry n5, and the fourth parity entry p3 to generate a fifth parity entry p4 (p4=p3+a0+n5). In response to the fourth update event, the memory system 110 can program the fifth update data entry n5 in an open memory block in the memory area or region in which the fourth parity entry p3 has been stored, as well as program the fifth parity entry p4 in an open memory block in the memory area or region in which the first data entry a0 has been stored.

Thereafter, the memory system 110 can change a logical address of the first data entry a0 to the indicator indicating the parity entry, and change a physical address of the first data entry a0 with a physical address of the fifth parity entry p4 in the map data (a0→p4), Also, the memory system 110 can change the indicator for the parity entry with a logical address of the fifth update data entry n5, and change a physical address of the previous parity p3 with a physical address of the fifth update data n5 in the map data (p3→n5). Through this operation, the fifth parity entry p4 changed through the fourth update event (a0 Del., n5 PGM) can be stored in a memory area or region which is different from that storing the fourth parity entry p3.

After operations according to the first to fourth update events, a plurality of data entries n4, n2, n3, a4, a5, n5, a7, . . . , n1 and a fourth parity entry p4 are stored through two program operations performed in each of partial memory regions (three memory regions) and one program operation performed in each of the other partial memory regions (three memory regions) in the memory device 150, In the embodiment of the memory system 110 that changes the location of storing the parity, even if some data entries among a plurality of data constituting the ChipKill decoding unit are updated several times a time lag, locations for some update data entries and calculated parity entries can be changed. It is possible to avoid an excessive increase of program-erase cycles (P/E Cycles) regarding a specific memory area or region for the program operation. As a result, program-erase cycles (PIE Cycles) regarding memory areas or regions may gradually increase, thereby avoiding a problem in which a specific memory area or region storing a parity entry has a shorter lifespan than other memory areas or regions.

Referring to FIG. 10, the memory system 110 can exchange two memory areas or regions in which an update data entry and a renewed parity entry according to an update event and new parity are stored, or allocate an open memory block included in a memory area or region for storing the renewed parity entry based on a comparison result of program-erase cycles (P/E Cycles) regarding memory areas or regions in the memory device 150. For example, an open memory block having the least program-erase cycles (P/E Cycles) can be allocated to store a newly calculated parity entry. On the other hand, when a memory area or region which have stored an updated data entry or an old data entry corresponding to the updated data entry is not allocated to store the newly calculated parity entry, the memory system 110 can allocate the memory area or region for storing another updated data entry.

According to an embodiment, program-erase cycles (P/E Cycles) of a memory block in a memory area or region in which a previous parity entry has been stored and program-erase cycles (PIE Cycles) of a memory block in another memory area or region constituting a same super memory block, a renewed parity entry can be stored in a memory area or region other than the memory area in which the previous parity entry has been stored.

Moreover, according to an embodiment, memory areas or regions in which an updated data entry and a renewed parity entry are stored may be not changed. For example, the program-erase cycle (PIE Cycles) of a memory block in the memory area where a previous parity has been stored is less than program-erase cycle (PIE Cycles) of another memory block in another memory area or region constituting a same super memory block, the renewed parity entry can be stored in the memory area in which the previous parity entry has been stored.

In a memory system according to an embodiment of the present disclosure, a controller can restore or recover a data entry based on an error correction code algorithm (e.g., chip-kill decoding, etc.) using a parity entry, even though an ECC error (e.g., uncorrectable ECC (UECC) error) occurs in some of plural data entries.

In an embodiment of the present disclosure, a memory system can perform read, write, and erase operations regarding a partial data entry among a group of plural data entries stored in a unit of super memory blocks, thereby reducing a write amplification factor (WAF) increase of a non-volatile memory device.

In an embodiment of the present disclosure, in a process of storing parity data, a memory system can avoid or reduce an excessive increase of program-erase cycles (PIE Cycles) regarding a location or a specific area used for a parity entry in the memory device, thereby improving a lifespan and durability of a non-volatile memory device.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
a memory device including a plurality of memory blocks establishing a super memory block for storing or outputting plural data entries and a first parity entry associated with the plural data entries; and
a controller configured to:
generate a second parity entry based on a part of the plural data entries, an updated data entry which renews the part of the plural data entries, and the first parity entry, in response to an update event regarding the part of the plural data entries;
allocate, for storing the second parity entry, a first memory block where the first parity entry was not stored prior to renewing the part of the plural data entries, the first memory block having least program-erase cycles among remaining memory blocks of the plurality of memory blocks where the first parity entry was not stored;
allocate, for storing the updated data entry, a second memory block which had stored the first parity entry; and
control the memory device to program the updated data entry in the second memory block and program the second parity entry in the first memory block.

2. The memory system according to claim 1,
wherein the memory device comprises at least one of a plurality of memory dies or a plurality of memory planes,
wherein each of the plurality of memory blocks establishing the super memory block is included in each of the plurality of memory dies or each of the plurality of memory planes.

3. The memory system according to claim 2, wherein both the first parity entry and the second parity entry are programmed in a same memory die or a same memory plane.

4. The memory system according to claim 2, wherein the first parity entry and the second parity entry are programmed in different memory dies or different memory planes.

5. The memory system according to claim 1, wherein the controller is further configured to retain map data associated with an unrenewed part of the plural data entries without renewal.

6. The memory system according to claim 1, wherein the controller is further configured to:
load map data from the memory device, the map data linking physical addresses of the plural data entries and the first parity entry to logical addresses of the plural data entries and a parity indicator for indicating the first parity entry;
update physical addresses in some entries of the map data, the some entries being associated with a logical address for the updated data entry and the parity indicator for indicating the second parity entry; and
program updated map data in the memory device.

7. The memory system according to claim 1, wherein the update event is generated based on at least one of garbage collection, wear leveling, or read reclaim, which is associated with copying or moving of the part of the plural data entries, or a program operation performed for renewing the part of the plural data entries when a write command along with the updated data entry is inputted from an external device.

8. A memory controller coupled to a memory device in which plural data entries and a first parity entry are distributed and stored in a plurality of memory regions, wherein the memory controller is configured to:
generate a second parity entry based on a part of the plural data entries, an updated data entry which renews the part of the plural data entries, and the first parity entry, in response to an update event regarding the part of the plural data entries,
select, for storing the second parity entry, an open memory block where the first parity entry was not stored prior to renewing the part of the plural data entries, the open memory block having least program-erase cycles among remaining memory blocks of open memory blocks in the plurality of memory regions where the first parity entry was not stored, and
control the memory device to program the updated data entry and the second parity entry in different memory regions including the selected open memory block.

9. The memory controller according to claim 8, wherein each of the plurality of memory regions comprises a memory die.

10. The memory controller according to claim 8, wherein each of the plurality of memory regions comprises a memory plane.

11. The memory controller according to claim 8, wherein the controller is further configured to:
generate the first parity entry based on the plural data entries;
select a first memory block which has least program-erase cycles among plural open memory blocks in the plurality of memory regions; and
program the first parity entry in the first memory block.

12. The memory controller according to claim 8, wherein the controller is further configured to:
load map data from the memory device, the map data linking physical addresses of the plural data entries and the first parity entry to logical addresses of the plural data entries and a parity indicator for indicating the first parity entry;
update physical addresses in some entries of the map data, the some entries being associated with a logical address for the updated data entry and the parity indicator for indicating the second parity entry while retaining the map data associated with an unrenewed part of the plural data entries without renewal; and
program updated map data in the memory device.

13. The memory controller according to claim 8, wherein the update event is generated based on at least one of garbage collection, wear leveling, or read reclaim, which is associated with copying or moving of the part of the plural data entries, or a program operation performed for renewing the part of the plural data entries when a write command along with the updated data entry is inputted from an external device.

14. The memory controller according to claim 8, wherein the controller is further configured to establish a super memory block based on the plurality of memory regions, and access a part of the plural data entries in a part of the plurality of memory regions during a read or write operation performed in response to a read or write command.

15. A method for operating a memory system, the method comprising:
distributing and storing plural data entries and a first parity entry in a plurality of memory regions included in a memory device;
generating a second parity entry based on a part of the plural data entries, an updated data entry which renews the part of the plural data entries, and the first parity entry, in response to an update event regarding the part of the plural data entries;
selecting, for storing the second parity data, a memory region including an open memory block where the first parity entry was not stored prior to renewing the part of the plural data entries, the open memory block having least program-erase cycles among the plurality of memory regions where the first parity entry was not stored; and
controlling the memory device to program the updated data entry and the second parity entry in different memory regions including the selected memory region.

16. The method according to claim 15, further comprising allocating, for storing the updated data entry, an open memory block included in a memory region storing the first parity entry among the plurality of memory regions.

17. The method according to claim 15, wherein the distributing and storing of the plural data entries comprises:
generating the first parity entry corresponding to the plural data entries; and
programming the first parity entry in a first memory block which has least program-erase cycles among plural open memory blocks in the plurality of memory regions.

18. The method according to claim 15, further comprising:
loading map data from the memory device, the map data linking physical addresses of the plural data entries and the first parity entry to logical addresses of the plural data entries and a parity indicator for indicating the first parity entry;
updating physical addresses in some entries of the map data, the some entries being associated with a logical address for the updated data entry and the parity indicator for indicating the second parity entry while retaining the map data associated with an unrenewed part of the plural data entries without renewal; and
programming updated map data in the memory device.

19. The method according to claim 15, wherein the update event is generated based on at least one of garbage collection, wear leveling, read reclaim, which is associated with copying or moving of the part of the plural data entries, or a program operation performed for renewing the part of the plural data entries when a write command along with the updated data entry is inputted from an external device.

* * * * *